United States Patent
Herzog et al.

(10) Patent No.: US 6,708,673 B2
(45) Date of Patent: Mar. 23, 2004

(54) FUEL FEED UNIT

(75) Inventors: Bernd Herzog, Hünfelden (DE); Helmut Nather, Bad Camberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/317,205

(22) Filed: Dec. 12, 2002

(65) Prior Publication Data

US 2003/0131829 A1 Jul. 17, 2003

(30) Foreign Application Priority Data

Dec. 13, 2001 (DE) .......................... 101 61 403

(51) Int. Cl.[7] .............................................. F02M 37/04
(52) U.S. Cl. ............. 123/509; 137/565.34; 137/565.17; 123/514
(58) Field of Search ................. 123/509, 514, 123/516, 198 D, 494; 137/565.33, 565.17, 565.34, 565.22, 565.29, 565.01, 265

(56) References Cited

U.S. PATENT DOCUMENTS

| | | | | |
|---|---|---|---|---|
| 4,860,714 A | * | 8/1989 | Bucci .......................... 123/514 |
| 5,855,197 A | * | 1/1999 | Kato ........................... 123/516 |
| 6,276,342 B1 | * | 8/2001 | Sinz et al. .................... 123/514 |
| 6,283,142 B1 | * | 9/2001 | Wheeler et al. .............. 137/265 |
| 6,371,153 B1 | * | 4/2002 | Fischerkeller et al. ....... 137/265 |
| 6,536,415 B2 | * | 3/2003 | Joos et al. ................... 123/497 |
| 6,553,973 B1 | * | 4/2003 | Coha et al. .................. 123/509 |
| 6,606,980 B1 | * | 8/2003 | Walter ........................ 123/509 |

FOREIGN PATENT DOCUMENTS

| | | |
|---|---|---|
| DE | 39 41 892 A1 | 6/1990 |
| DE | 42 01 037 A1 | 7/1993 |
| DE | 44 00 958 C1 | 4/1995 |
| DE | 44 35 703 A1 | 4/1996 |
| DE | 195 12 700 A1 | 10/1996 |
| DE | 195 44 049 A1 | 5/1997 |
| EP | 0 959 242 A1 | 11/1999 |
| FR | 2 753 748 A1 | 3/1998 |
| WO | WO 99/17013 | 4/1999 |

* cited by examiner

Primary Examiner—Carl S. Miller
(74) Attorney, Agent, or Firm—Morrison & Foerster LLP

(57) ABSTRACT

In a fuel feed unit, two anti-surge pots are connected to one another within a fuel tank by means of a connecting element. For installation, the anti-surge pots are introduced into the fuel tank singly through an installation opening, and are then connected to one another. This means that only a single installation opening is required in the fuel tank for two anti-surge pots.

13 Claims, 2 Drawing Sheets

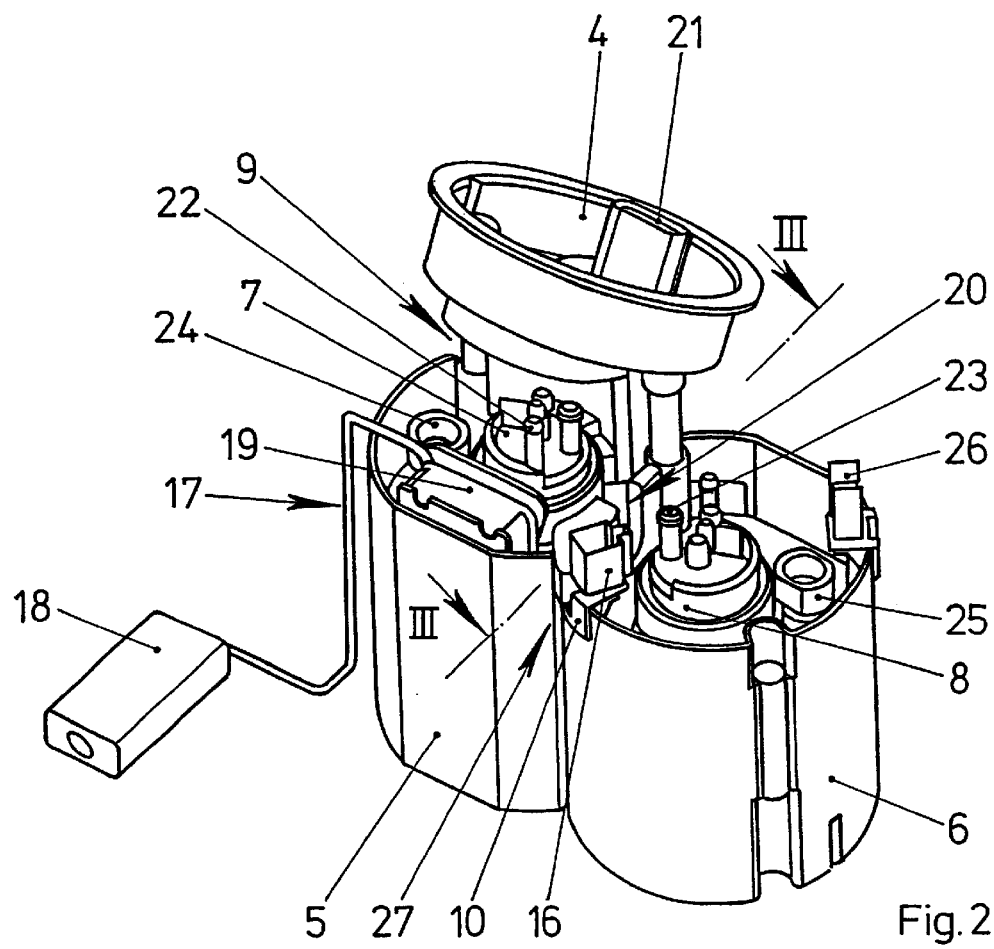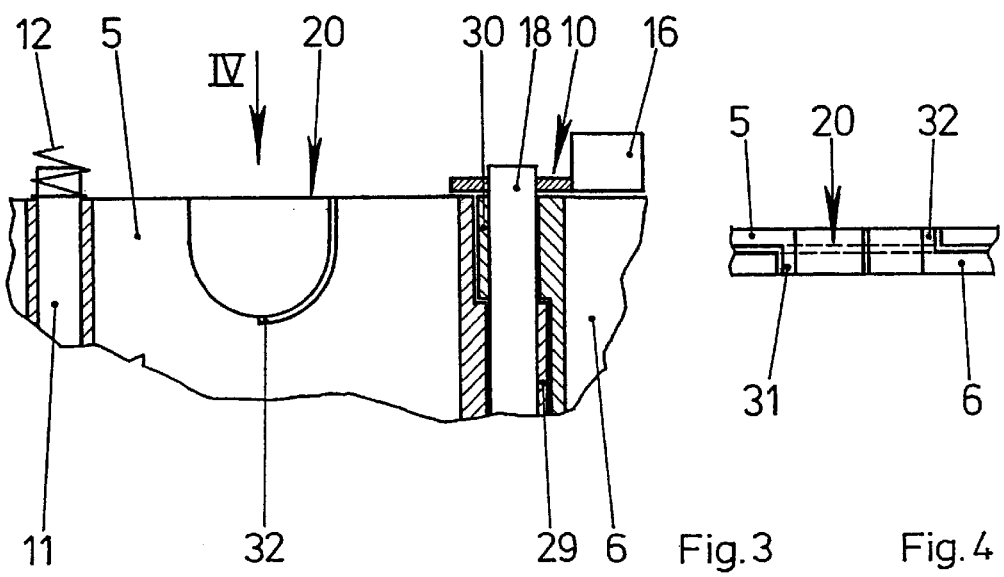

FUEL FEED UNIT

CLAIM FOR PRIORITY

This application claims priority to Application No. 10161403.9 which was filed in the German language on Dec. 13, 2001.

TECHNICAL FIELD OF THE INVENTION

The invention relates to a fuel feed unit for a motor vehicle with a plurality of anti-surge pots to be arranged in a fuel tank and with feed pumps for drawing in fuel from the anti-surge pots and feeding it to an internal combustion engine of the motor vehicle.

BACKGROUND OF THE INVENTION

Fuel feed units are used in modern fuel tanks when the capacity of a single feed pump is not sufficient, as known in practice. In this context, one anti-surge pot in each case is connected by means of a bottom support to a respective flange inserted in a sealing manner into an installation opening in the fuel tank. In each case, the bottom supports preload the anti-surge pots against the bottom of the fuel tank. An electrically driven feed pump is inserted into each of the anti-surge pots. The fuel feed unit known in practice thus has two flanges, which are installed in the installation openings independently of one another.

SUMMARY OF THE INVENTION

The invention seeks to configure a fuel feed unit such that it can be produced economically and can be assembled in a particularly simple manner.

According to one embodiment of the invention, there is a connecting element for connecting the anti-surge pots within the fuel tank.

By virtue of this configuration, a single installation opening in the fuel tank and a single flange are required for the insertion of a plurality of anti-surge pots. The anti-surge pots can be inserted individually into the fuel tank and connected to one another within the fuel tank. This makes the fuel feed unit according to the invention particularly economical and allows it to be installed in the fuel tank in a particularly simple manner. The fuel tank can likewise be manufactured economically. Another advantage of this configuration is that the risk of leaks and permeation of fuel into the environment can be kept particularly small owing to the small number of sealing areas of the flanges.

If the anti-surge pots are of identical construction, this contributes to a further reduction in the manufacturing costs for the fuel feed unit according to the invention.

According to still another embodiment of the invention, connecting the anti-surge pots within the fuel tank requires a particularly small amount of effort on installation if the connecting element has a latching connection to at least one of the anti-surge pots.

According to another advantageous development of the invention, the anti-surge pots are held reliably against one another in their envisaged position if the connecting element has a pin that connects the anti-surge pots to one another.

If the anti-surge pots are manufactured in one piece with the sleeves accommodating the pins, this contributes to a further reduction in the manufacturing costs for the fuel feed unit according to the invention.

In one aspect of the invention, if the connecting element has an electrical terminal for a respective feed pump arranged in each of the anti-surge pots, this contributes to a further simplification of the installation of the fuel feed unit according to the invention.

According to yet another embodiment of the invention, having one anti-surge pot run dry while the second anti-surge pot is full can be avoided if the anti-surge pots each have mutually facing apertures. The anti-surge pots thus have an overflow region for excess fuel.

According to still another embodiment of the invention, alignment of the anti-surge pots relative to one another is particularly simple if webs are arranged in the region of the apertures.

According to another advantageous development of the invention, permanent alignment of the anti-surge pots relative to one another can be achieved if the anti-surge pots are manufactured in one piece with the webs.

The design of the fuel feed unit according to the invention is particularly simple if a bottom support, which is attached to a flange that closes the fuel tank, holds just one of the anti-surge pots.

In one aspect of the invention, if a fuel-level sensor is attached to one of the anti-surge pots, this contributes to a further simplification of the structure of the fuel feed unit according to the invention.

BRIEF DESCRIPTION OF THE DRAWINGS

The invention allows numerous embodiments, which are illustrated in the drawings and described below. In the drawings:

FIG. 2 shows a perspective representation of the fuel feed unit according to the invention from FIG. 1.

FIG. 3 shows a partial section through the fuel feed unit from FIG. 2 along the line III—III.

FIG. 4 shows a view of an aperture of the fuel feed unit from position IV in FIG. 3.

DETAILED DESCRIPTION OF THE INVENTION

Figure 1:
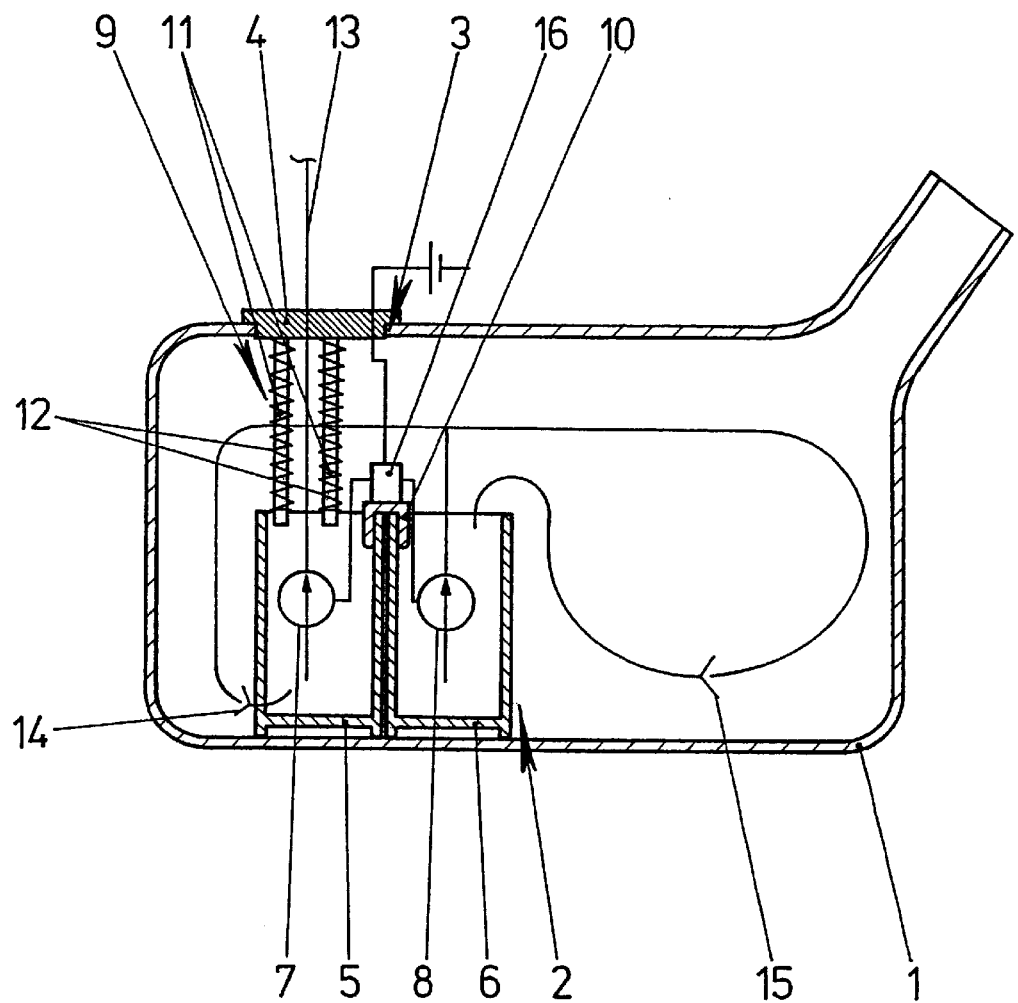
FIG. 1 shows a fuel tank of a motor vehicle with a fuel feed unit according to the invention.

FIG. 1 shows a fuel tank 1 with a fuel feed unit 2 arranged in it. The fuel feed unit 2 has a flange 4, which is inserted in a sealing manner into an installation opening 3 in the fuel tank 1, and two anti-surge pots 5, 6. A feed pump 7, 8 is arranged in each of the anti-surge pots 5, 6. The flange 4 is connected to one of the anti-surge pots 5 by means of a bottom support 9. The anti-surge pots 5, 6 are attached to one another by means of a connecting element 10. The bottom support 9 has two tubes 11 for guiding one anti-surge pot 5 relative to the flange 4 and spring elements 12 for preloading the anti-surge pots 5, 6 against the bottom of the fuel tank 1. The feed pumps 7, 8 feed fuel into a common forward-flow line 13, which leads to an internal combustion engine (not shown) of the motor vehicle, and to two suction jet pumps 14, 15 arranged in the fuel tank 1. The connecting element 10 furthermore holds an electrical terminal 16 for the feed pumps 7, 8.

FIG. 2 shows the fuel feed unit 2 from FIG. 1 in perspective. For the sake of simplicity, electrical leads and fuel lines are not shown. One of the anti-surge pots 5 holds a fuel-level sensor 17 with a float 18 and a supply transmitter 19. The supply transmitter 19 produces electrical signals as a function of the position of the float 18. In their upper part, the anti-surge pots 5, 6 have mutually facing apertures 20.

These apertures 20 allow fuel to flow from one anti-surge pot 5, 6 to the other anti-surge pot 5, 6. An electrical terminal 21 is arranged in the flange 4. The feed pumps 7, 8 each have connections 22, 23 for the lines leading to the forward-flow line 13 illustrated in FIG. 1. On the anti-surge pots 5, 6 there are connections 24, 25 and a holding clip 26 for the lines leading from the suction jet pumps 14, 15 illustrated in FIG. 1 into the anti-surge pots 5, 6 and for a return line (not shown), leading back from the internal combustion engine of the motor vehicle into the fuel tank 1. The connecting element 10 has a latching connection 27 with one of the anti-surge pots 6.

In a section through the fuel feed unit from FIG. 2 along the line III—III, FIG. 3 shows that the connecting element 10 holds a pin 28. The pin 28 passes through two sleeves 29, 30, each sleeve 29, 30 being manufactured in one piece with one of the anti-surge pots 5, 6. The mutually facing apertures 20 of the anti-surge pots 5, 6 are illustrated in FIG. 4 in a view from position IV in FIG. 3. The anti-surge pots 5, 6 each have webs 31, 32, by means of which they are aligned relative to one another.

What is claimed is:

1. A fuel feed unit for a motor vehicle, comprising:
    a plurality of anti-surge pots to be arranged in a fuel tank;
    feed pumps to draw in fuel from the anti-surge pots and feeding the fuel to an internal combustion engine of the motor vehicle; and
    a connecting element to connect the anti-surge pots within the fuel tank.
2. The fuel feed unit as claimed in claim 1, wherein the anti-surge pots are of identical construction.
3. The fuel feed unit as claimed in claim 1, wherein the connecting element has a latching connection to at least one of the anti-surge pots.
4. The fuel feed unit as claimed in claim 1, wherein the connecting element has a pin that connects the anti-surge pots to one another.
5. The fuel feed unit as claimed in claim 4, wherein the anti-surge pots are manufactured in one piece with sleeves accommodating the pin.
6. The fuel feed unit as claimed in claim 1, wherein the connecting element has an electrical terminal for a respective feed pump arranged in each of the anti-surge pots.
7. The fuel feed unit as claimed in claim 1, wherein the anti-surge pots each have mutually facing apertures.
8. The fuel feed unit as claimed in claim 7, further comprising webs arranged in the region of the apertures.
9. The fuel feed unit as claimed in claim 8, wherein the anti-surge pots are manufactured in one piece with the webs.
10. The fuel feed unit as claimed in claim 9, wherein a bottom support, which is attached to a flange that closes the fuel tank, holds one of the anti-surge pots.
11. The fuel feed unit as claimed in claim 1, wherein a fuel-level sensor is attached to one of the anti-surge pots.
12. The fuel feed unit as claimed in claim 1, wherein a bottom support, which is attached to a flange that closes the fuel tank, holds one of the anti-surge pots.
13. The fuel feed unit as claimed in claim 2, wherein the connecting element has a latching connection to at least one of the anti-surge pots.

* * * * *